Figure 2:
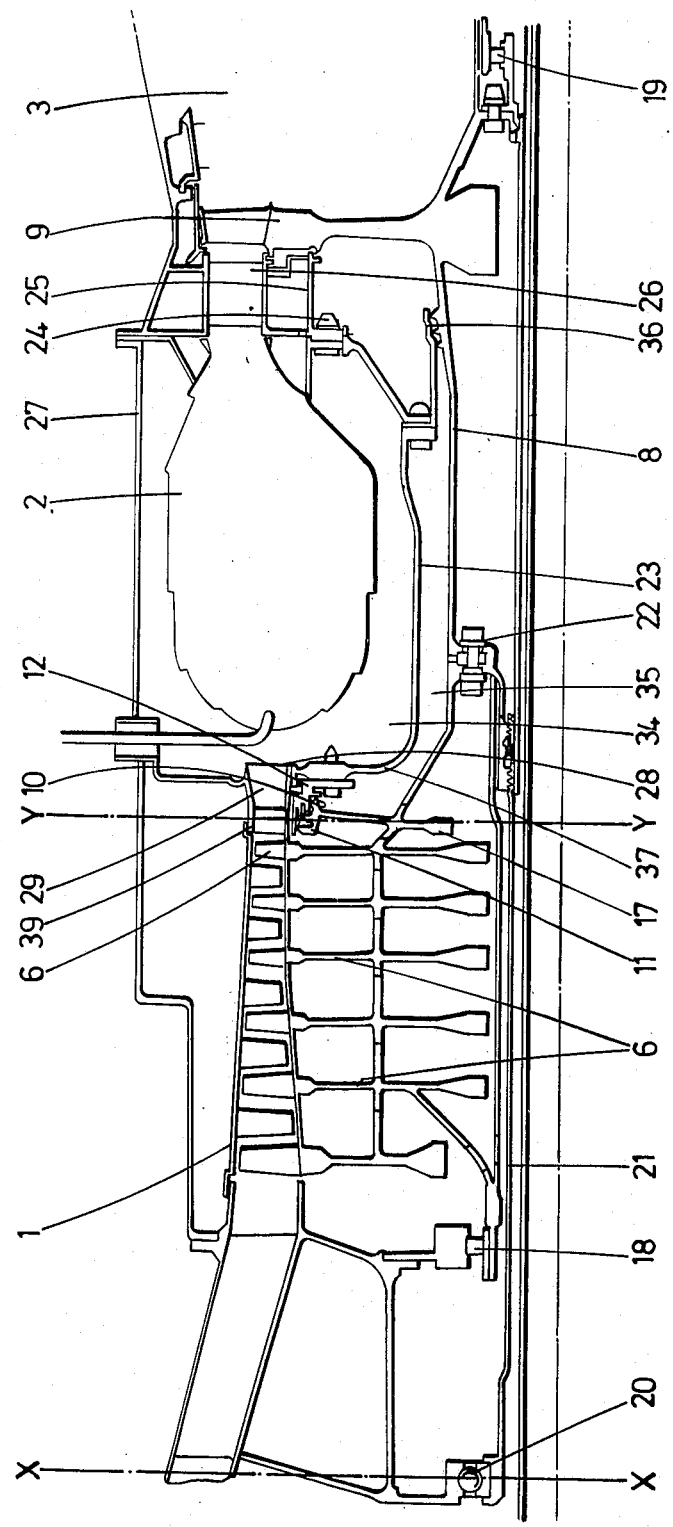

United States Patent [19]
Gardiner

[11] 3,908,361
[45] Sept. 30, 1975

[54] SEAL BETWEEN RELATIVELY MOVING COMPONENTS OF A FLUID FLOW MACHINE

[75] Inventor: Terence Edward Gouvenot Gardiner, Bristol, England

[73] Assignee: Rolls-Royce (1971) Limited, London, England

[22] Filed: Dec. 14, 1973

[21] Appl. No.: 424,762

[30] Foreign Application Priority Data
Dec. 16, 1972 United Kingdom............... 58223/72

[52] U.S. Cl............... 60/39.32; 60/39.36; 415/113; 415/138; 277/57
[51] Int. Cl.² .................... F02C 7/20; F01D 11/06
[58] Field of Search............ 60/39.31, 39.32, 39.36, 60/39.65; 415/113, 134–139; 277/53–57

[56] References Cited
UNITED STATES PATENTS

| 2,743,579 | 5/1956 | Gaubatz | 60/39.36 |
|---|---|---|---|
| 2,851,246 | 9/1958 | Nichols | 415/136 |
| 2,875,579 | 3/1959 | Gerdan et al. | 60/39.31 |
| 2,938,342 | 5/1960 | Lombard et al. | 60/39.31 |
| 2,977,760 | 4/1961 | Soltau et al. | 60/39.65 |
| 3,018,113 | 1/1962 | Hall | 277/53 |
| 3,501,089 | 3/1970 | Alford | 277/53 |
| 3,572,728 | 3/1971 | Smuland | 277/57 |
| 3,606,349 | 9/1971 | Petrie et al. | 277/57 |
| 3,620,012 | 11/1971 | Wilde | 60/39.65 |
| 3,709,637 | 1/1973 | Petrie et al. | 60/39.32 |

Primary Examiner—C. J. Husar
Assistant Examiner—Robert E. Garrett
Attorney, Agent, or Firm—Stevens, Davis, Miller & Mosher

[57] ABSTRACT

A seal at the downstream end of a compressor of a gas turbine engine is formed between a rotor element of the compressor and a stationary element carried by the combustion chamber inner casing, the combustion chamber inner casing is mounted at its downstream end rigidly to the engine casing so that the upstream end is free to move under the influence of both pressure and temperature changes within the engine the seal being adapted to compensate for relative movement between the compressor rotor and the combustion chamber inner casing.

7 Claims, 3 Drawing Figures

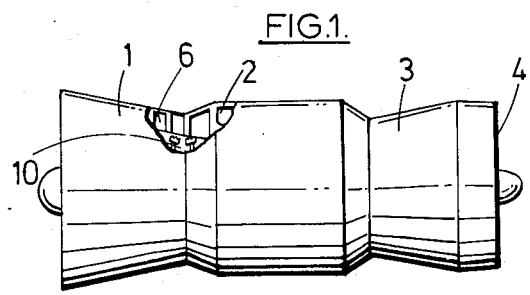
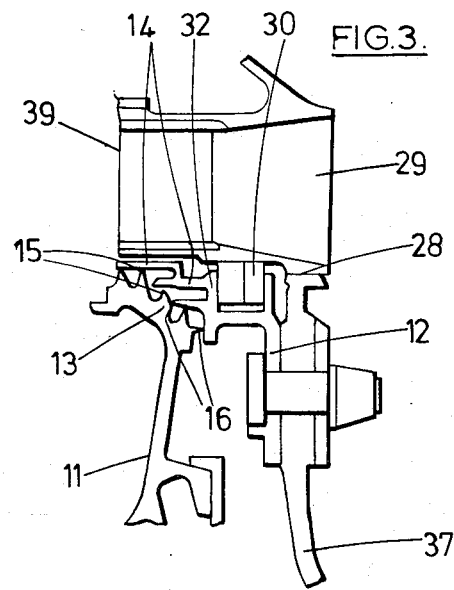

SEAL BETWEEN RELATIVELY MOVING COMPONENTS OF A FLUID FLOW MACHINE

The present invention relates to seals between relatively moving components of a fluid flow machine, the seal being the type in which a small sealing clearance is provided between sealing members carried by the components.

A problem with seals of the type described in any fluid flow machine is that, relative movement of the two components can occur due, for example, to differential thermal expansion during different operating conditions of the engine. This can cause either opening of the sealing clearance, and thus a reduction in the effectiveness of the seal, or closing of the sealing clearance, with the consequent danger of the seal parts rubbing together and causing damage to the engine.

An object of the present invention is to provide a seal of the type described which maintains a sealing clearance within a specified range under different operating conditions of the machine.

According to the present invention there is provided a seal between two relatively moving components of a fluid flow machine comprising, a first sealing member carried by a first of the components and a second sealing member carried by the other of the components and spaced from the first sealing member to provide a sealing clearance therebetween, one of the members being mounted on a component which is capable of movement relative to the other member under the influence of a pressure differential across it which varies with different operating conditions of the machine so that the sealing clearance is maintained within a predetermined range.

Movement of the seal under different pressure conditions may be achieved by carrying one of the sealing members on a diaphragm which is sufficiently resilient to deflect under variations of the pressure difference existing across it.

Additionally the two sealing members may be mounted in such a manner that the effects of thermal expansion of the components on which they are mounted cause them both to move in the same sense.

In one embodiment of the invention the sealing members are carried by structural elements of a gas turbine engine and the seal adjusts under different operating conditions of the engine.

In a gas turbine engine embodiment the seal is an axial seal, i.e., one in which one of the sealing members extends substantially axially of the engine to within a sealing clearance of a substantially radially extending portion on the other sealing member.

Movement of the seal members under different temperature conditions may be varied by a suitable choice of materials of the two components of the engine to give differential thermal expansions thereof, or by forming one of the components or the sealing member carried on one of the components in the form of a bi-metallic strip or sheet.

The seal may be a compound seal having sealing clearances lying in planes at right angles. Thus in the gas turbine engine embodiment the sealing elements may provide both radial and axial sealing clearances.

One example of the invention will now be more particularly described with reference to the accompanying drawings in which:

FIG. 1 is a diagrammatic illustration of a gas turbine engine incorporating the seal of the present invention, FIG. 2 is an enlarged view of the internal parts of the engine of FIG. 1, to which the invention relates, and FIG. 3 is an enlarged view of the seal.

Referring now to FIG. 1, there is shown a gas turbine engine having a compressor 1, combustion chamber 2, a turbine 3 and a propulsion nozzle 4, all in flow series. The engine may be of any known type and is not described in detail. Thus the engine may be a single or multispool engine and may be of the by-pass type.

The invention concerns a seal within the engine and is applicable to many of the seals in all parts of the engine. In the particular embodiment described the invention is applied to a seal 10 between the delivery end of the compressor 1 and the combustion chamber 2.

Referring now to FIGS. 2 and 3, the seal 10 comprises a rotating member 11 and a stationary member 12. Member 11 is provided with radially extending fins 13 and member 12 is provided with axially extending fins 14.

The radially extending fins 13 on member 11 co-operate with the radially inner surfaces of the axially extending fins 14 on member 12 to provide a first series of radial sealing clearances at 15, while the axially extending fins 14 on member 12 co-operate with the flanks of the radially extending fins on the member 11 to provide a second series of axial sealing clearances 16. The surfaces of the respective fins are each provided with an abradable coating where there is a danger of contact by the co-operating fin on the other member.

Seal member 11 is carried on a disc 17 which is attached to and driven by the compressor 1, downstream of the last of the rotor stages 6.

The compressor rotor itself is connected by means of a shaft 8 to a rotor 9 of the turbine 3, and the shaft 8 is supported in roller bearings 18 and 19 for rotation therein with freedom for axial thermal expansion. The shaft is also mounted for rotation in a ball bearing 20 by means of a tubular member 21 connected to the shaft at a joint 22, and is thus located in a datum radial plane xx against axial movement. By virtue of this form of mounting, when the engine gets hot in operation the tubular member expands rearwardly from the datum plane xx but the compressor rotor expands forwardly from the joint 22. Since the engine outer casing downstream of the plane xx also expands rearwardly there is a net movement of the compressor rotor relative to the static structure at the radial plane yy of the seal. The magnitude of this relative movement is dependent on the different temperatures and co-efficients of thermal expansion of the casing, the shaft 8 and the member 21, but in the embodiment described the resultant movement is a net forward movement of the rotor relative to the static structure at the plane yy thus opening the axial sealing clearances 16.

In order to compensate the sealing clearance for this forward movement, seal member 12 is carried on the upstream end of the inner casing 23 of the combustion chamber, and the casing 23 is fixed at its downstream end by bolts 24, to a cylinder 25 connected to the radially inner ends of a ring of outlet guide vanes 26. The guide vanes 26 are themselves connected to the casing 27 of the engine so that by virtue of these connections the combustion chamber inner casing 23, is, in effect, cantilevered from the engine casing 27. Thus the upstream end is free to move under the influence of temperature and pressure changes in the engine, and a sliding joint 28 is provided between the upstream end of the combustion chamber inner casing 23 and the outlet diffuser 29 of the compressor to support the casing 24 while allowing for said movement. The joint 28 may include axial splines for additional location. A piston ring seal 30 is provided between a flange 32 carried by the seal member, and the diffuser 29 to prevent air from flowing from the space 34 surrounding the combustion chamber 2 forwards into the compressor.

In operation, as the temperature in the engine increases the compressor rotor moves forwards as described above. Because the combustion chamber inner casing 23 is mounted at its rearward end from the engine casing, its expansion causes a forward movement of the seal member 14. This forward movement is in part counteracted by a rearward movement of the nozzle guide vanes relative to the plane xx due to the expansion of the outer casing 27. The result is that the increases in the axial sealing clearances 16 due to the rotor movement are reduced.

The cantilevered mounting of the combustion chamber inner casing 23 from its rearward end enables further control of the sealing clearances 16 to be made using the pressure variations in the engine. The casing 23 divides the spaces between the combustion chamber 2 and the shaft 8 into two spaces 34 and 35. Space 35 is sealed by means of seals 10 and 36 and the pressure in the space is that of air which has leaked through these seals. The pressure in space 34, however, is the highest pressure in the engine. This pressure difference gives rise to a force on the end wall or diaphragm 37 of the casing 23 which acts to deflect the diaphragm forwardly. Since the pressure in space 34 rises as the engine speed and temperature rise this deflection acts to move the sealing element 12 to keep pace with the movement of the sealing element 11 on the compressor rotor. The amount of deflection can be pre-determined by designing a suitable stiffness into the diaphragm 37 and by carefully selecting the radial height and angle of inclination of the diaphragm.

Two additional benefits are available with the above-described construction. The nozzle guide vanes 26 have a rearward force on them due to the pressure difference across them. Since the combustion chamber inner casing 23 is attached to the ring of guide vanes 26 any force on the casing will be transmitted to the guide vanes. Since the forward load on the diaphragm 37 due to the pressure differential across it will always be greater than the rearward load across the rearward end of the casing due to the pressure differential across it, the casing 23 can be arranged to have significant forward force on it by arranging that the diameter of the sliding joint 28 is greater than the diameter of the connection 24.

Thus the force on the nozzle guide vanes is reduced and this can result in a saving in material or, expense, in the manufacture of these vanes. Similarly, since none of the forward force of the casing 23 can be transmitted to the outlet guide vanes 39 across the sliding joint 28, these vanes are not further loaded by the construction according to the invention.

A calculation for a typical engine showing the clearances in a seal for the old construction and the construction according to the above-described embodiment is as follows: considering the conditions prevailing at the engine cruise condition, i.e. maximum continuous operating condition.

| | | |
|---|---|---|
| 1. | Axial clearance of old construction | 1.160 mm |
| | NEW CONSTRUCTION | |
| 2. | Thermal growth of static parts (forwards) | 0.196 mm |
| 3. | Thermal growth of rotating parts (forwards) | 0.520 mm |
| 4. | Axial gap due to thermal expansion 3 − 2 | 0.324 mm |
| 5. | Deflection of casing 23 due to gas load (forward) | 0.927 mm |
| 6. | Resultant axial interference 4 − 5 | 0.603 mm |
| 7. | Gyro deflection (forward) | 0.044 mm |
| 8. | Total axial interference 6 + 7 | 0.647 mm |
| 9. | Running clearance given 0.750 mm cold setting with no gyro load | 0.147 mm |

It is clear therefore that by choosing the correct initial clearance when the engine is built and by suitable choice of materials, the present design allows freedom for choice of very small running clearances, whereas the previous design even set with a zero cold clearance developed a 1.16 mm running clearance due to the uncompensated forward movement of the rotor seal. At the highest pressure point in the engine such a gap represents a considerable loss of engine performance and the present invention is able to considerably reduce this loss.

A stop may be provided at joint 28 to prevent excessive deflection due to the pressure difference across the end wall.

In an alternative embodiment, the upstream radial wall of the casing 23 which carries one seal member may be made in the form of a bi-metallic strip or sheet, such that any increase or decrease in temperature of the wall will cause the bi-metallic portion to bend towards or away from the other seal member. For example, excessive leakage of warm air through the seal can be arranged to affect the bi-metallic portion in a manner such as to cause the casing wall to move to reduce the sealing clearance.

I claim:

1. A gas turbine engine having a casing, a rotor, and a seal therebetween, said seal comprising a first sealing member carried by a part of the rotor and a second sealing member carried by an element of the casing and spaced from the first sealing member to define a sealing clearance therebetween, wherein the rotor part is adapted to move under various engine running conditions to vary the sealing clearance, means are provided for fixing the casing to static structure at one end away from the casing element, and at the other end there is provided a joint between the casing element and static structure which allows freedom of movement of said casing element in the direction of movement of the rotor, means being provided for producing a pressure differential across said casing element which varies with the engine running conditions and which causes movement of the casing element in said direction to follow movement of the rotor part to maintain said sealing clearance in a pre-determined range.

2. A gas turbine engine according to claim 1, wherein said joint is a sliding joint and a further seal is provided between the casing element and the static structure.

3. A gas turbine engine according to claim 1, wherein the casing element is a resilient member capable of deflection under variations of the pressure differential.

4. A gas turbine engine according to claim 1, wherein the gas turbine engine has a combustion chamber, and a compressor rotor, and wherein said casing forms the inner casing thereof and said casing element is the upstream end wall of the casing, said first sealing member being carried on the downstream end part of the compressor rotor.

5. A gas turbine engine according to claim 1, wherein the gas turbine engine has a combustion chamber casing and a compressor rotor, and wherein one of the sealing members is mounted on said compressor rotor and the other of the sealing members is mounted on said combustion chamber casing.

6. A gas turbine engine according to claim 4 including means defining chambers on opposite sides of said combustion chamber casing and having means for supplying engine working fluid at different pressures to the said chambers thereby to produce said differential pressure across at least said front end wall of the casing.

7. A gas turbine engine according to claim 4 and in which the said front end wall comprises bi-metallic means responsive to temperature variations of the front end wall under different engine operating conditions for flexing towards or away from the said rotor mounted sealing member.

* * * * *